(No Model.)

O. H. BASQUIN.
ANGLE MEASURING DEVICE.

No. 595,260. Patented Dec. 7, 1897.

Witnesses:
Frank S. Blanchard
Donald M. Carter

Inventor:
Olin H. Basquin
By Francis W. Parker,
Attorney.

UNITED STATES PATENT OFFICE.

OLIN H. BASQUIN, OF CHICAGO, ILLINOIS, ASSIGNOR TO THE LUXFER PRISM PATENTS COMPANY, OF WEST VIRGINIA.

ANGLE-MEASURING DEVICE.

SPECIFICATION forming part of Letters Patent No. 595,260, dated December 7, 1897.

Application filed February 9, 1897. Serial No. 622,648. (No model.)

*To all whom it may concern:*

Be it known that I, OLIN H. BASQUIN, a citizen of the United States, residing at Chicago, in the county of Cook and State of Illinois, have invented certain new and useful Improvements in Angle-Measuring Devices, of which the following is a specification.

My invention relates to angle-measuring devices, and has for its object to provide a new and improved device for measuring angles, of which the following is a description, reference being had to the accompanying drawings, wherein—

Figure 1:
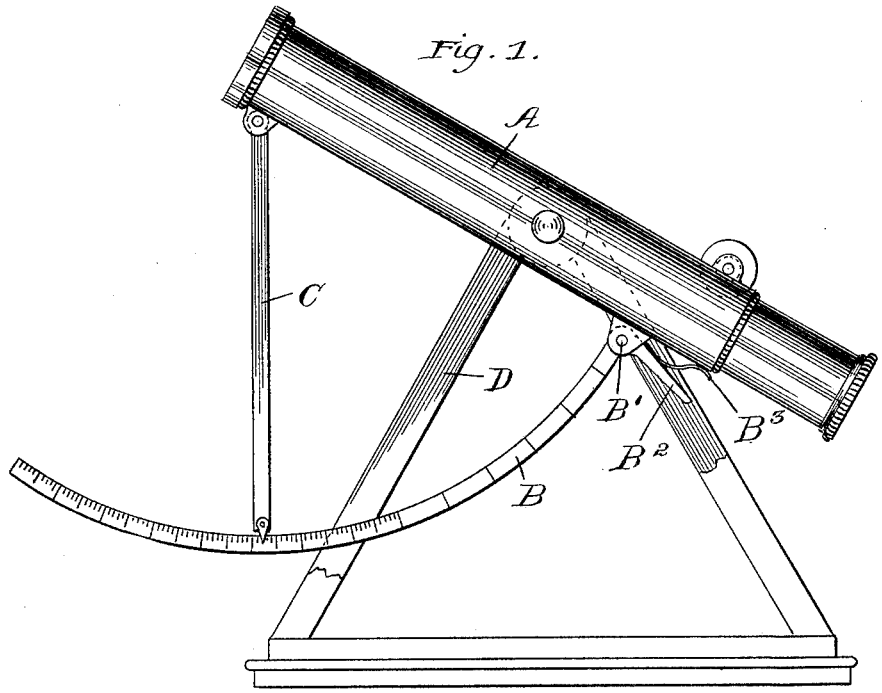
Figure 2:
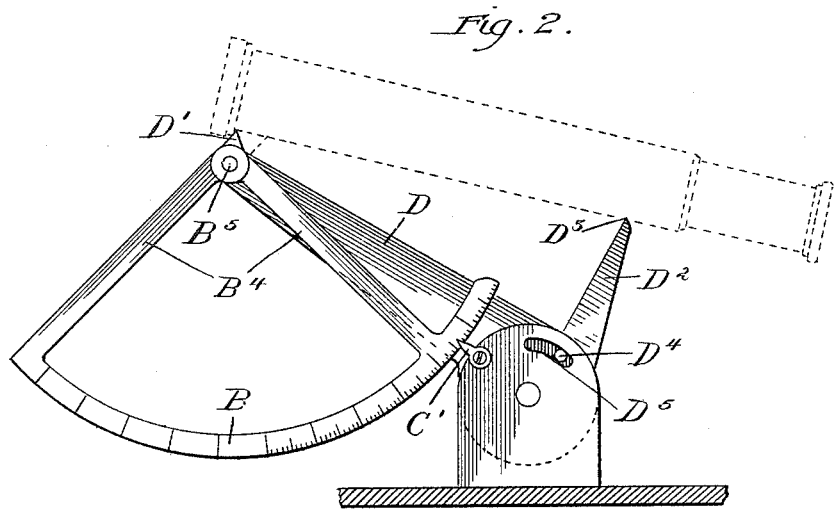

Figure 1 shows a side view of an angle-measuring device embodying my invention. Fig. 2 shows a modified form of angle-measuring device.

Like letters refer to like parts throughout both figures.

My present invention is particularly adapted to be used in connection with prismatic lights.

When windows are provided with prismatic lights, the dimensions or angles of the prisms depend upon the angle at which the rays of light strike the window and upon the angle at which it is desired to have them leave the window. In cities or other places where there are high buildings the buildings on one side of the street shut off a portion of the light which would otherwise fall upon the windows on the opposite side of the street. The angles of the prisms to be used in any given window, when the angle at which the light leaves the prisms in the window is known, may be ascertained if the angle at the window from the horizon, subtended by the building or other obstacle which cuts off the lower light, is known. The object of my invention is to provide an angle-measuring device by which this angle can be easily and quickly ascertained.

Referring now to Fig. 1 of the drawings, a sighting device or telescope A is provided with a graduated scale or arc B, movably connected thereto, as by being pivoted at B'. This arc is provided with a projection $B^2$. A spring $B^3$ is interposed between the telescope and the projection $B^2$ and tends normally to force said projection away from the telescope. An arm C is pivotally connected to the telescope and is provided at its end with the indicating device C', adapted to swing along the arc B, the arm acting as a plumb-line.

The angle-measuring device is preferably used without a support, but it may be placed on any desired support—as, for example, the support D.

In Fig. 2 I have indicated a modified form of my device. In this construction the graduated arc B is provided with the projecting arms $B^4$, which meet at the center of the circle of which the graduated arc is a portion, the whole being pivoted at $B^5$ to the pieces or arm D, having at its outer end the projection or sight D'. An arm $D^2$ is placed at an angle to the arm D and is provided with the point or sight $D^3$. A pointer C' is attached to the arm D and is adapted to indicate the angle on the graduated arc B. The arm $D^2$ is preferably pivotally connected to the arm D or to some part connected therewith. As shown in the drawings, said arm is provided with a pin $D^4$, which projects through a slot $D^5$, the whole arranged so that the arm $D^2$ may be folded up when not in use. The sights D' and $D^3$ may be so formed that a telescope may be placed thereon, as shown in dotted lines. This device is preferably used without a telescope.

I have shown two forms of my device in order to more clearly illustrate my invention; but it is evident that other constructions than the ones herein shown may be used to obtain the result desired, and I therefore do not wish to be limited in any particular to the construction shown.

The use and operation of my invention are as follows:

Referring to Fig. 1, the graduated arc B is normally forced against the swinging arm C by the spring $B^3$, thereby preventing the arm from moving. When it is desired to ascertain the angle from the horizon subtended by any object—as, for example, a building—the telescope is pointed at the top of the building and the graduated arc is moved by an upward pressure of the projection $B^2$, so as to free the arm C, which acts as a plumb-line and moves along the graduated arc, its position depending upon the angular position of the telescope. After the telescope has been directed toward the top of the object the graduated arc is allowed to move, so as to engage the swinging arm C and prevent its further movement. The instrument may then be lowered and the desired angle read from the graduated arc, the pointer C′ indicating such angle.

When the device shown in Fig. 2 is used, the line of sight is obtained by the two sights D′ and D³. As the arm D is moved the arc B swings around its pivotal point, and when the sights are directed at the top of the object the angle from the horizon subtended by the object will be indicated upon the arc B by the pointer C′.

It will be seen that I have here an angle-measuring device which can be used by any one and which needs no careful adjustment in order to correctly measure the angle.

I claim—

An angle-measuring device comprising a frame, a sighting device pivoted on such frame, an arc-shaped scale pivoted on such frame, a spring device associated therewith tending to move the arc-shaped scale toward the sighting device, a pointer pivoted on the sighting device and substantially equal in length to the distance between the pivotal connections of such pointer and scale with the sighting device, substantially as shown and described.

OLIN H. BASQUIN.

Witnesses:
DONALD M. CARTER,
BERTHA C. SIMS.